(12) United States Patent
Colunga (10) Patent No.: US 8,073,111 B2
(45) Date of Patent: *Dec. 6, 2011

(54) SYSTEMS AND METHODS FOR PROVIDING 9-1-1 SERVICES TO NOMADIC INTERNET TELEPHONY CALLERS

(75) Inventor: Elizabeth Anita Colunga, Rowlett, TX (US)

(73) Assignee: Plateau Investments B.V. LLC, Dover, DE (US)

( * ) Notice: Subject to any disclaimer, the term of this patent is extended or adjusted under 35 U.S.C. 154(b) by 220 days.

This patent is subject to a terminal disclaimer.

(21) Appl. No.: 12/346,223

(22) Filed: Dec. 30, 2008

(65) Prior Publication Data

US 2009/0110154 A1    Apr. 30, 2009

Related U.S. Application Data

(63) Continuation of application No. 11/064,973, filed on Feb. 25, 2005, now Pat. No. 7,508,922.

(51) Int. Cl.
  *H04M 11/00* (2006.01)
(52) U.S. Cl. .......................... 379/45; 370/352
(58) Field of Classification Search ............ 379/45, 379/37, 90.01; 370/352
  See application file for complete search history.

(56) References Cited

U.S. PATENT DOCUMENTS

| | | | |
|---|---|---|---|
| 6,529,722 B1 | 3/2003 | Heinrich et al. | |
| 6,574,484 B1 | 6/2003 | Carley | |
| 6,587,545 B1 | 7/2003 | Antonucci et al. | |
| 6,650,901 B1 | 11/2003 | Schuster et al. | |
| 7,508,922 B2 * | 3/2009 | Colunga | 379/45 |
| 2002/0101961 A1 | 8/2002 | Karnik et al. | |
| 2003/0076815 A1 | 4/2003 | Miller et al. | |
| 2004/0105529 A1 | 6/2004 | Salvucci et al. | |
| 2004/0190497 A1 | 9/2004 | Knox | |
| 2005/0238142 A1 | 10/2005 | Winegarden | |

OTHER PUBLICATIONS

Vidal, Ron, "Enhancing 911: How VoIP Technology Can Improve Public Safety", Telecommunications Magazine, Sep. 2004, pp. 1-5.
"MCI Viewpoint: MCI Advantage Technology Overview", Jul. 15, 2003, pp. 1-15.
Schulzrinne, Henning, "911 services: wireline, wireless and VoIP" Columbia University, New York, FCC Solutions Summit, Mar. 18, 2004, 18 pp.
Rosenberg et al., "SIP: Session Initiation Protocol", Internet Engineering Task Force, Request for Comment 3261, Jun. 2002.
"Infrastructure of audiovisual services—Systems and terminal equipment for audiovisual services", Telecommunication Standardization Sector of ITU, ITU-T H.323, Jul. 2003.
Voice On the Net (VON) Coalition/NENA 9-1-1 Working Group: "Answering the call for 9-1-1 Emergency Services in an Internet World" [Online] Jan. 2005. pages 1-17 XP002580919 NENA/VON Retrieved from the Internet: URL:http://www.von.org/usrfiles/911%20VON%20White%20Paper%201-12-05%20final.pdf> [retrieved on May 3, 2010].
Abbott N: "Alternatives for providing routing and location information to support emergency calling from IP enterprises" NENA Technical Information Document, XX, XX. Oct. 3, 2003. pp 1-16.

* cited by examiner

Primary Examiner — Stella Woo (57) ABSTRACT

A system for facilitating 9-1-1 service delivery to internet telephony customers is provided. The system includes a server device for receiving a 9-1-1 call from a user device via a data network, where the 9-1-1 call are based on "9-1-1" digits dialed at the user device. The server device is configured to forward the received 9-1-1 call to an operator services interface operatively connected to the server device.

22 Claims, 5 Drawing Sheets

SYSTEMS AND METHODS FOR PROVIDING 9-1-1 SERVICES TO NOMADIC INTERNET TELEPHONY CALLERS

This application is a continuation of U.S. application Ser. No. 11/064,973, filed Feb. 25, 2005, the entire contents of which is incorporated herein by reference.

FIELD OF THE INVENTION

The present invention relates generally to the field of voice over internet telephony, and more particularly to providing emergency call handling in internet telephony.

BACKGROUND OF THE INVENTION

Figure 1:
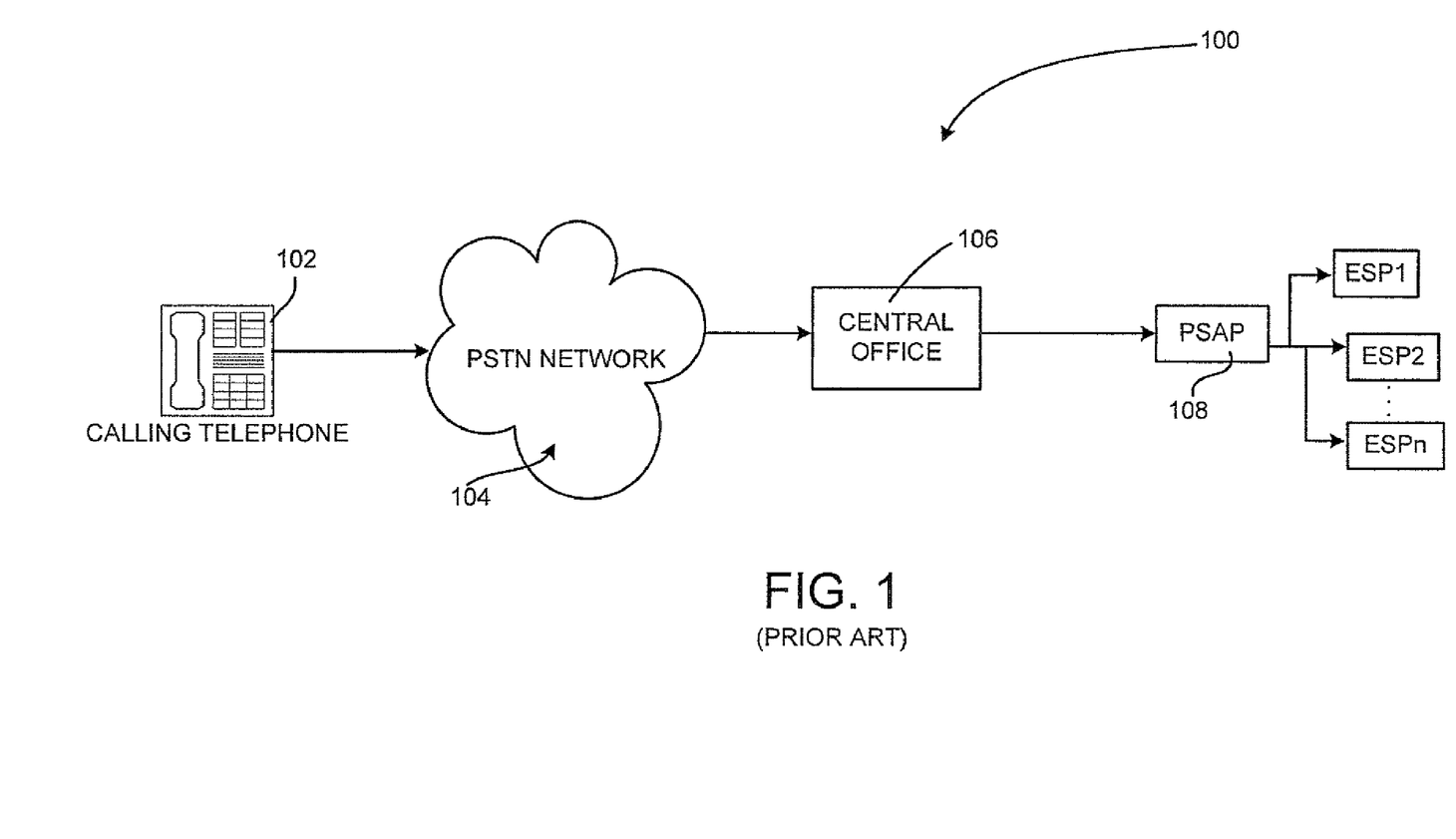
FIG. 1 is a schematic diagram illustrating one example of a conventional 9-1-1 system.

The telephone number 9-1-1 has been designated as the universal emergency number for public use to request emergency assistance. The code 9-1-1 was chosen because it is brief, easily remembered and can be dialed quickly. FIG. 1 is a schematic diagram illustrating one example of a conventional 9-1-1 system 100. As shown, system 100 includes a user telephone 102, a telecommunications company central office 104 in telecommunication with telephone 102 over a fixed wireline telephone network (e.g., public switched telephone network (PSTN)) 106, and a public service answering point (PSAP) 108 in telecommunication with the central office. Depending on the area of service, typically a county or state, there may be one or more PSAPs. PSAP 108 functions to dispatch or transfer incoming 9-1-1 calls to the proper law enforcement, fire protection, emergency medical service or agency, etc. (collectively, "emergency service providers") responsible for responding to the emergency. In system 100, all 9-1-1 calls originating from telephone 102 are directed to a particular PSAP 108 through central office 104, depending on the exchange (i.e., first three digits) of the calling party number (CPN). In system 100, an operator at PSAP 108 then determines the location and type of the emergency and transfers the call to the proper one of a plurality of emergency service providers ESP1, ESP2, ... ESPn that should respond to the call.

Figure 2:
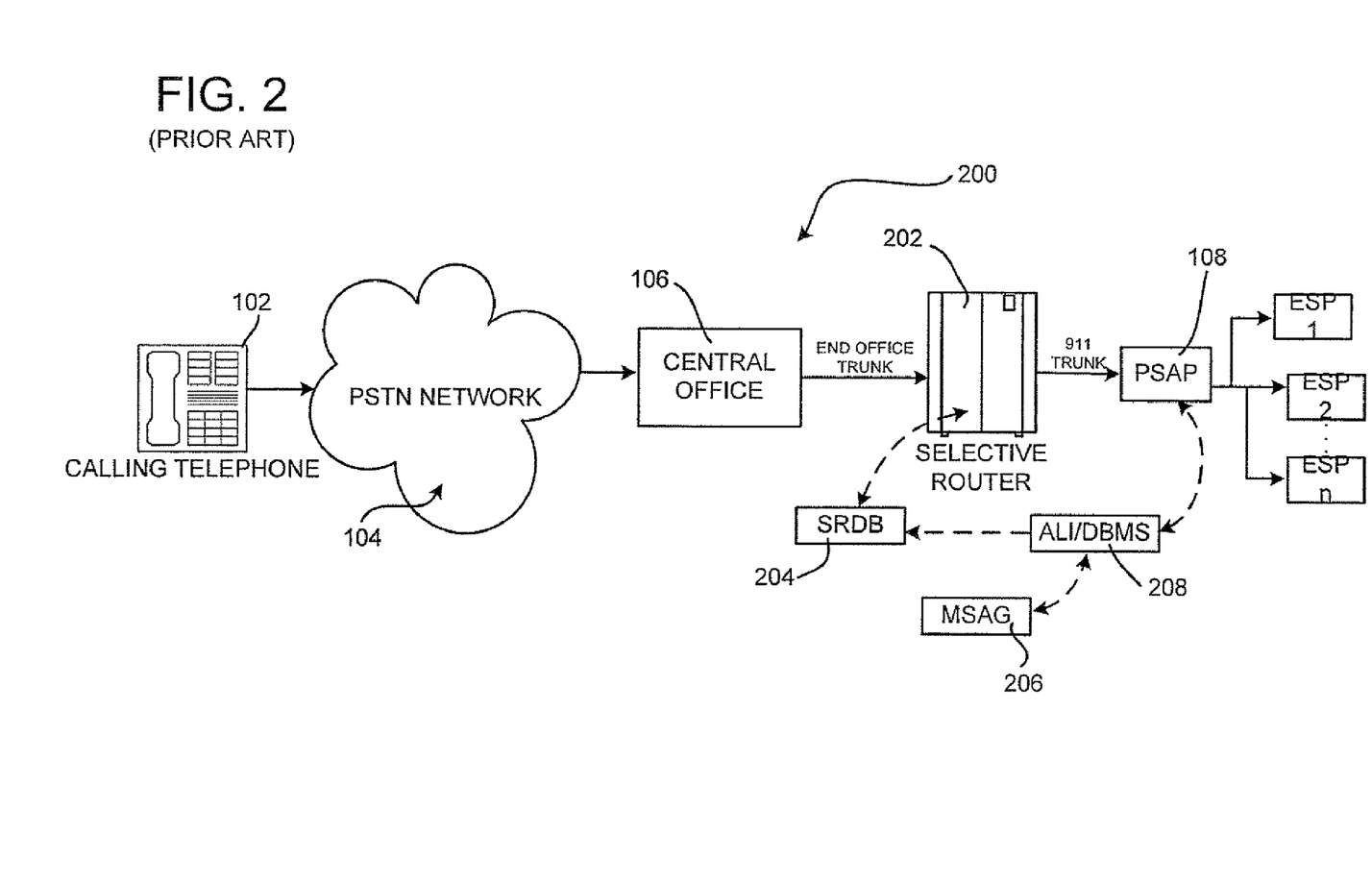
FIG. 2 is a schematic diagram illustrating one example of a conventional E-911 system.

An enhanced 9-1-1 (E-911) system has evolved from the Basic 9-1-1 system by providing an automated system for selectively routing 9-1-1 calls originating from telephone equipment at fixed address locations to the proper PSAP 108. FIG. 2 schematically illustrates an E-911 system 200 similar to system 100 described above. In E-911 system 200, telephone 102 has a telephone number TN2 and a calling party number CPN associated therewith. System 200 further includes a selective router 202 operated in association with the central office 104, and an associated selective routing database (SRDB) 204. Selective router 202 is an automated routing device that searches database 204 for a match with the particular CPN received from telephone 102. System 200 determines the primary PSAP for receiving emergency calls from the address of the subscriber of the CPN from SRDB 204.

In addition to SRDB 204, system 200 also includes emergency service numbers (ESNs) assigned to each ANI based on the customer's location as pre-validated against a master street address guide (MSAG) 206. The MSAG includes a listing of all streets and house numbers ranges within a specific 9-1-1 service area. The streets and address ranges are assigned selective routing codes, or emergency service numbers (ESNs), to enable proper routing of 9-1-1 calls. Accordingly, MSAG 206 is a summary database of valid address ranges, with the corresponding ESN for each range. Each assigned ESN is a unique number assigned to combinations of PSAP, police, fire and emergency service (EMS) providers. System 200 further includes an automatic location identifier Data Base Management System (ALI/DBMS) 208 including CPN, subscriber name, valid MSAG address information and the associated ESN. As with MSAG 206 ALI/DBMS 208 is in operatively connected to PSAP 108, MSAG 206 and SRDB 204.

In operation, 9-1-1 calls from telephone 102 are received at central office 104 and transferred to selective router 202. Selective router 202 then searches SRDB 204 for routing instructions assigned to the ESN associated with the CPN received in the incoming call. The routing instructions assigned to the ESN are associated with the telephone number of the PSAP that should receive emergency calls from the address of the subscriber of the CPN (i.e., PSAP 108). Selective router 202 then uses this telephone number to transfer the 9-1-1 call to the designated PSAP 108. Upon having the call routed to the appropriate PSAP 108 by selective router 202, PSAP 108 queries ALI/DMBS 208 to determine the name and address of the CPN subscriber and predetermined emergency service providers ESPn. This information is then displayed on a 9-1-1 PSAP operator's ALI screen.

With the increasing ubiquity of the Internet and Internet availability, there has been an increasing desire to leverage its robust and inexpensive architecture for voice telephony services, commonly referred to as voice over IP (internet protocol), or VoIP. Toward this end, standards for internet telephony have been promulgated by both the International Telecommunication Union Telecommunication Standardization Sector (ITU-T) in the form of H.323 rev 5 (2003), "Packet based multimedia communications systems" as well as the Internet Engineering Task Force (IETF) in the form of RFC 3261 (2002), "Session Initiation Protocol (SIP)" to enable set-up and teardown of the media sessions.

Unfortunately, existing VoIP offerings fail to adequately provide suitable 9-1-1 or E-911 services due mainly to the fact that originating VoIP devices, unlike conventional land line telephones, may not be associated with a specific geographical location.

Typically, in conventional local service access VoIP systems, 9-1-1 calls are not processed in the manner described above for conventional telephone calls. In some instances, VoIP 9-1-1 calls are blocked from completion. This clearly is an unacceptable option for dealing with 9-1-1 calls. In alternative systems, VoIP service providers perform dialed digit manipulation on 9-1-1 calls and replace the dialed "9-1-1" digits with a ten digit emergency services telephone number associated with the VoIP subscriber's TN and location at the time service is ordered. Unfortunately, such calls are not routed through the 9-1-1 system described above and are, therefore, not handled with the exceptional level of care and priority afforded to traditional 9-1-1 calls. Additionally, no Automatic Location Identification (ALI) information is provided to the emergency service provider along with the call.

There remains a significant need for systems and methods that support 9-1-1 call functionality for internet telephony customers who utilize VoIP in a mobile or nomadic environment.

SUMMARY OF THE INVENTION

In accordance with one implementation consistent with the principles of the invention, a system is provided for facilitating 9-1-1 service delivery to internet telephony customers. The system includes a server device for receiving a 9-1-1 call from a user device via a data network, where the 9-1-1 call is based on "9-1-1" digits dialed at the user device. The server device is configured to forward the received 9-1-1 call to an operator services interface operatively connected to the server device.

In another implementation consistent with the principles of the invention, a method is provided for providing 9-1-1 services to an internet telephony user. The method includes: receiving a 9-1-1 call based on dialed digits "9-1-1" from a user device via a data network; translating the dialed digits "9-1-1" to a "0" digit; and forwarding the received 9-1-1 call, in response to the translated "0" digit, to an operator services interface.

BRIEF DESCRIPTION OF THE DRAWINGS

The accompanying drawings, which are incorporated in and constitute a part of this specification, illustrate an implementation of the invention and, together with the description, explain the invention. In the drawings.

DETAILED DESCRIPTION OF THE PREFERRED EMBODIMENTS

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention provide systems and methods for facilitating 9-1-1 services adoption and implementation for internet telephony phone calls. According to one implementation, 9-1-1 calls received from mobile internet telephony user devices via an IP network may be directly forwarded to an operator services interface for personnel handling. The operator services personnel may extract location information from the caller, identify the PSAP associated with the location and forward the call to the PSAP via the 9-1-1 network.

Exemplary System

Figure 3:
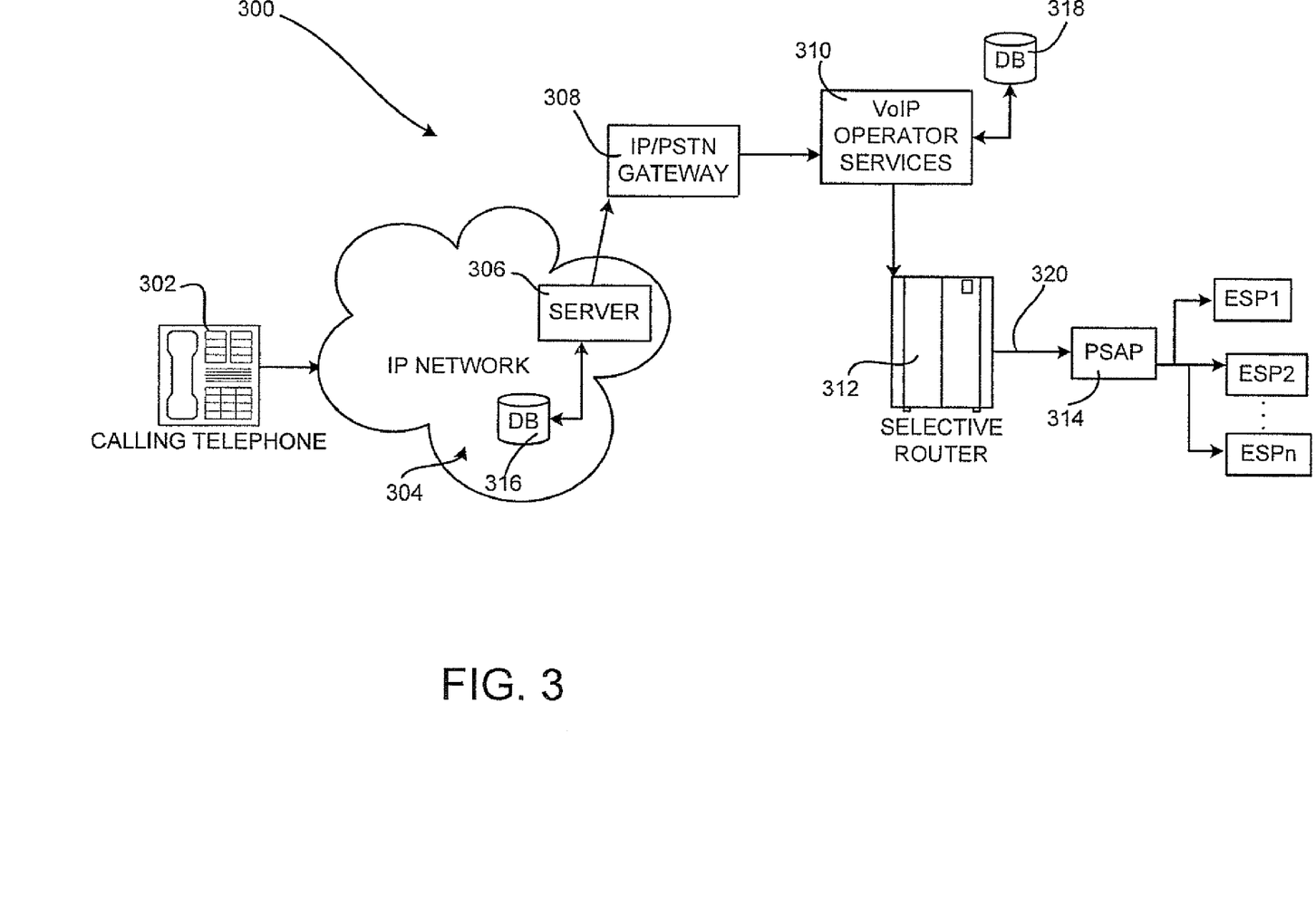
FIG. 3 is a schematic diagram illustrating an exemplary system in which methods and systems consistent with the present invention may be implemented.

FIG. 3 illustrates an exemplary system 300 in which methods and systems consistent with the present invention may be implemented. As shown, system 300 may include a VoIP user device 302 connected to an IP network 304, a server device 306 associated with network 304, a gateway device 308 operatively connected to server 306 for translating IP calls between IP network 304 and conventional PSTN devices, a VoIP operator services interface 310 connected to gateway 308 for receiving requests for operator services (e.g., a dialed "0") from VoIP user device 302. Additionally, system 300 may include an incumbent local exchange carrier (ILEC) selective router 312 operatively connected to VoIP operator services interface 310 and a PSAP 314 operatively connected to the selective router 312. Further, system 300 may include a database 316 for maintaining customer profile information and a database 318 for facilitating PSAP identification.

Consistent with principles of the invention, VoIP user device 302 may be any suitable device for enabling voice communication via IP network 304 and may include wired VoIP telephones, SIP telephone devices, H.323 telephone devices, software-based VoIP telephony interfaces (for running on laptop or personal computers), wireless (e.g., 802.11 (x)-based) VoIP phones, conventional analog telephones connected to IP network 304 via digital gateways, or any device capable of initiating, transmitting, and receiving voice and data communications to network 304. It should be understood that the single instance of VoIP user device 302 illustrated in FIG. 3, is provided for simplicity. In practice, a typical system may include any number and type of VoIP user devices 302.

In one implementation consistent with principles of the invention, server device 306 may include any combination of hardware and software (e.g., a SIP proxy server and/or SIP redirect server) capable of receiving a VoIP call from telephone 302, examining the call request, and routing the call to an appropriate destination. Details regarding the specific functionality of server 306 will be set forth in additional detail below. Gateway device 308 may also include any combination of hardware and software capable of translating IP-based call information onto a conventional PSTN telephone network.

Database 316 associated with server 306 maintains profile information for each VoIP user device 302 associated with server 306. In one implementation, the profile information includes at least a calling party number (CPN) associated with the VoIP user device 302 as well as an indication regarding whether the VoIP user device 302 has a "fixed" profile with an MSAG valid geographic location or is "nomadic" in that it may be moved into any geographic location, where the actual location is not automatically identified at the time a 9-1-1 call is made. In one exemplary implementation, each CPN has NPA-NPX-XXXX format as designated by the North American Numbering Plan, where NPA relates to the area code, NPX relates to the exchange code, and XXXX relates to the line number. Upon receiving a dialed 9-1-1 call from VoIP user device 302, server 306 may retrieve the profile of user device 302, based on the CPN associated with the call.

In one embodiment, 9-1-1 calls originating from user devices having a nomadic profile indication result in server 306 performing dialed digit manipulation on the 9-1-1 dialed number to a dialed "0" number. Once such manipulation has been performed, server 306 routes the call through gateway 308 to VoIP operator services interface 310. In one exemplary implementation, 9-1-1 dialed calls routed to VoIP operator services interface 310 may be afforded a higher priority than conventional dialed "0" calls. In this manner, emergency calls are handled in a more expeditious manner.

In an alternative implementation, fixed location VoIP 9-1-1 calls may be similarly routed to VoIP operator services interface 310 in instances where an ANI associated with the fixed location BTN is not resolvable. This may happen due to recent account setup, improper database entry, or other technical errors. Because the call is routed to the VoIP operator services interface rather than dropped, the 9-1-1 is handled and emergency services may be properly dispatched.

Once terminated at VoIP operator services interface 310, interactive querying of the caller by operator services interface personnel may then be performed to identify a geographic location of the caller and a type of emergency. Once this information has been obtained, an appropriate PSAP or emergency service provider (ESP) associated with the location and type of emergency may be identified. In one exemplary implementation consistent with principles of the invention, PSAP/ESP identification may be performed by referencing an interactive database 318 in response to geographic location information received from the 9-1-1 caller. Following geographic location and corresponding PSAP/ESP identification, a call to the identified PSAP may be initiated through conventional 9-1-1 channels call flow methods and procedures.

More specifically, for E-911 enabled PSAP's, a call may be initiated by the operator services personnel between VoIP operator services interface 310 and identified PSAP 314 via selective router 312 for transferring or forwarding the received 9-1-1 call to the appropriate PSAP. In one implementation, the call may be initiated via a dedicated 911 trunk line 320 associated with PSAP 314 by dialing a discrete ten digit number associated with PSAP 314. Upon receipt of such a call, selective router 312 may forward the call on the appropriate trunk line to PSAP 314. Because selective router 312 typically makes call routing decisions based on an ANI associated with a received call, a pre-determined ANI may be associated with operator assisted calls, thereby enabling direct call routing based on the called number associated with the desired PSAP.

Furthermore, in accordance with one implementation consistent with principles of the invention, PSAP 314 may receive the call from interface 310 having specific or non-specific call information associated therewith. For example, all emergency calls originating from interface 310 may include data indicating that the call is an operator assisted call and that correct location and number must be obtained by the PSAP operator receiving the call. As is known in the art, conventional PSAPs maintain systems for receiving call data for incoming 9-1-1 calls, such as ANI, ALI, etc. In an additional implementation, call data included for operator assisted 9-1-1 calls may be modified to indicate preliminary location or other information received by the telephony operator services personnel during interaction with the caller. In this manner, relevant information may be more quickly passed to appropriate PSAP or ESP personnel.

Figure 4:
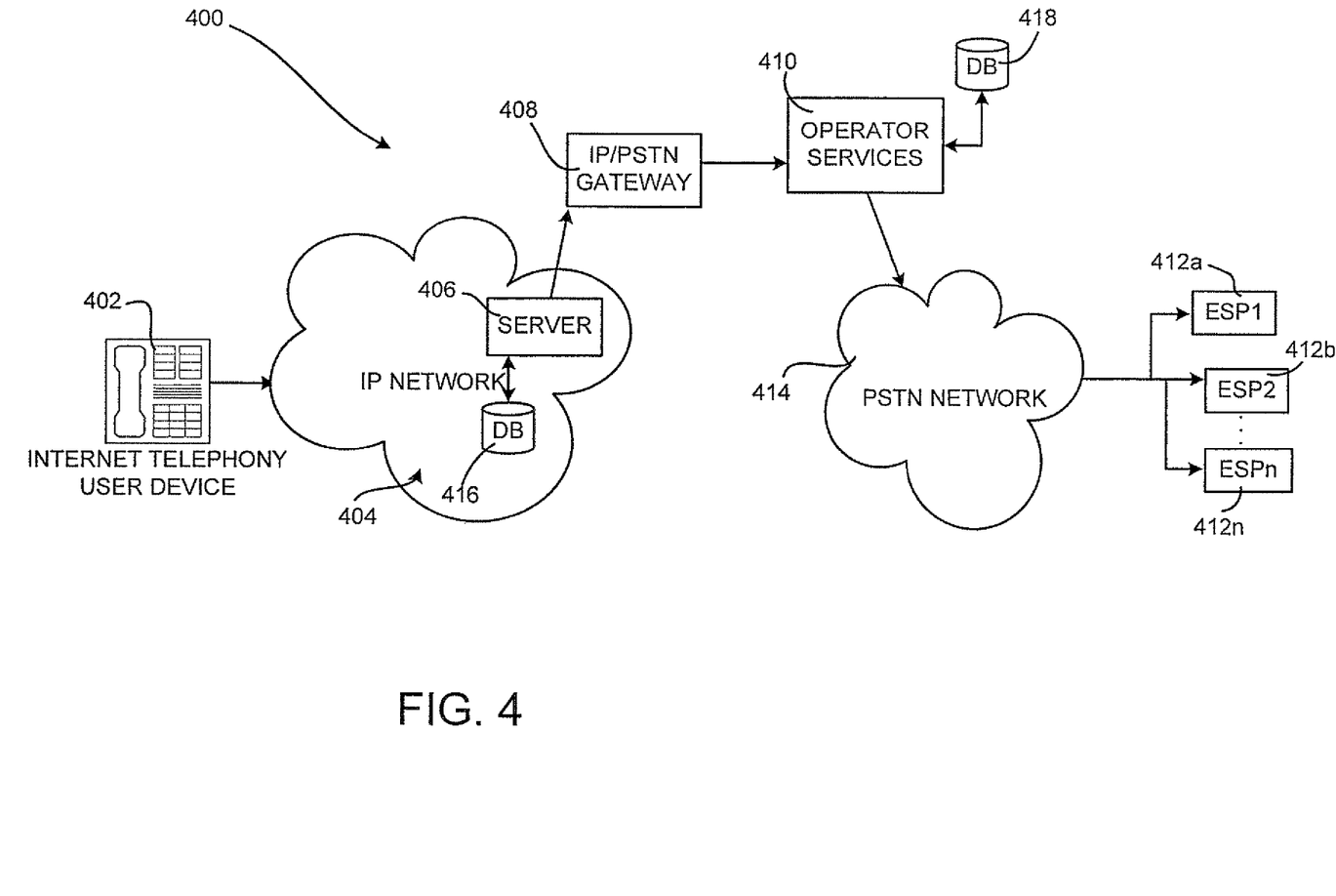
FIG. 4 is a schematic diagram illustrating an second exemplary system in which methods and systems consistent with the present invention may be implemented.

FIG. 4 illustrates another exemplary system 400 in which methods and systems consistent with the present invention may be implemented. As shown, system 400 may include an internet telephony user device 402 connected to an IP network 404, a server device 406 associated with network 404, a gateway device 408 operatively connected to server 406 for translating internet telephony calls between IP network 404 and conventional PSTN devices, an operator services interface 410 connected to gateway 408 for receiving requests for operator services (e.g., a dialed "0") from internet telephony user device 402. Additionally, system 400 may include a number of emergency service providers (e.g., 412a, 412b, 412n) operatively connected to operator services interface 410 via PSTN network 414.

As described in detail above, internet telephony user device 402 may be any suitable device for enabling voice communication via IP network 404 and may include wired VoIP telephones, SIP telephone devices, H.323 telephone devices, software-based VoIP telephony interfaces (for running on laptop or personal computers), wireless (e.g., 802.11(x)-based) VoIP phones, conventional analog telephones connected to IP network 304 via digital gateways, or any device capable of initiating, transmitting, and receiving voice and data communications to network 404.

In one implementation, server device 406 may include both a SIP proxy server and a SIP redirect server capable of receiving an IP call from telephone 402, managing the setup, processing, and tear down of the call, examining call data, determining appropriate treatment for the call, and routing the call to an appropriate destination. Gateway device 408 may also include any combination of hardware and software capable of translating IP-based call information onto a conventional PSTN telephone network.

A database 416 associated with server 406 maintains profile information for each internet telephony user device 402 associated with server 406. In one implementation, the profile information includes at least a calling party number (CPN) associated with the internet telephony user device 402 as well as an indication regarding whether the internet telephony user device 402 has a fixed geographic location or is "nomadic" in that it may be moved into any geographic location. Upon receiving a dialed 9-1-1 call from internet telephony user device 402, server 406 may retrieve user device 402's profile, based on a calling party number (CPN) associated with the call.

In accordance with one implementation, 9-1-1 calls originating from user devices having a nomadic profile indication result in server 406 performing dialed digit manipulation on the 9-1-1 dialed number to a dialed "0" number. Once such manipulation has been performed, server 406 routes the call through gateway 408 to operator services interface 410. In one exemplary implementation, 9-1-1 dialed calls routed to operator services interface 410 may be afforded a higher priority than conventional dialed "0," calls. In this manner, emergency calls are handled in a more expeditious manner.

In an alternative implementation, fixed location internet telephony 9-1-1 calls may be similarly routed to operator services interface 310 in instances where an ANI associated with the fixed location BTN (billing telephone number) is not resolvable. This may happen due to recent account setup, improper database entry, or other technical errors. Because the call is routed to the operator services interface rather than dropped, the 9-1-1 is handled and emergency services may be properly dispatched.

Once terminated at operator services interface 410, interactive querying of the caller by operator services interface personnel may then be performed to identify a geographic location of the caller and a type of emergency. Once this information has been obtained, an appropriate emergency service provider (ESP) associated with the location and type of emergency may be identified. In one exemplary implementation, ESP identification may be performed by referencing an interactive database 418 in response to geographic location information received from the 9-1-1 caller. Following geographic location and corresponding ESP identification, a call to the identified ESP (e.g., 412a, 412b, 412n) may be initiated by using a conventional ten digit dialed number associated with the ESP and initiating the call via PSTN network 414. It should be understood that, although the numeric string "9-1-1" is described above, systems consistent with principles of the invention may operate in response to any suitable universalized dialing sequence associated with a location-sensitive emergency service.

Exemplary Processing

Figure 5:
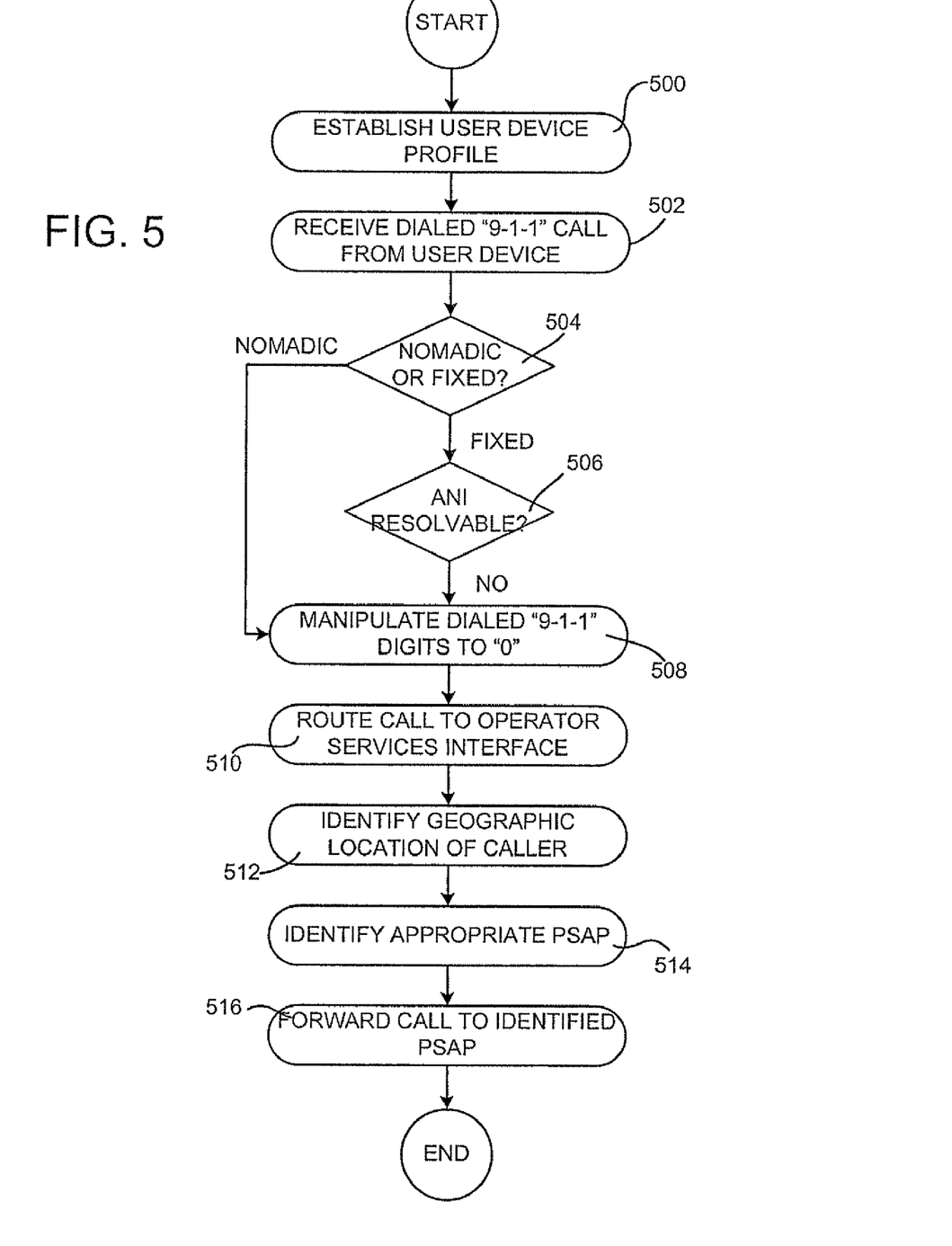
FIG. 5 is an exemplary flow diagram illustrating one method for connecting internet telephony user devices to 9-1-1 services.

FIG. 5 is an exemplary flow diagram illustrating one method for connecting internet telephony user devices to 9-1-1 services. Initially, an internet telephony profile is established by an internet telephony service provider for a particular internet telephony user device 302 (act 500). In one exemplary implementation, establishing an internet telephony profile includes collecting and storing (e.g., in database 316) at least a calling party number (CPN) associated with the internet telephony device and an indication regarding whether the device is a nomadic (or mobile) device or a fixed location device. For fixed location devices, a billing telephone number (BTN) may be associated with the CPN and a specific geographic location may be associated with the BTN for subsequent use in routing fixed location 9-1-1 calls to an appropriate PSAP or ESP.

Following profile establishment, a dialed "9-1-1" call is received at server device 306 from internet telephony user device 302 via IP network 304 (act 502). As described above, server device 306 may include VoIP proxy and redirect servers suitable for processing routing received calls over IP network 304. Once received, server device 306 determines whether the internet telephony user device 302 is a nomadic or fixed location device based, at least in part, on the indication contained within the device's profile (act 504).

If it is determined that internet telephony user device 302 is a nomadic device, the method proceeds to act 508 set forth in detail below. However, if it is determined that the calling device is a fixed location device, it is next determined whether an ANI may be resolved from the CPN associated with internet telephony user device 302 (act 506). If the calling device is a nomadic device or if an ANI for the calling device is not resolvable, the dialed digits are manipulated by server 306 into a dialed "0" (act 508). In response to the dialed "0" the call is routed to internet telephony operator services interface 310 via gateway 308 (act 510). By manipulating the dialed "9-1-1" digits into a dialed "0", previously dropped or improperly routed emergency calls are forwarded to internet telephony operator services for efficient and expeditious handling and dispatch to appropriate emergency services.

Following forwarding to internet telephony operator services interface 310, operator services personnel present at interface 310 may query the caller regarding their geographic location and the type of emergency situation that is occurring (act 512). In one embodiment, this query may include verbal questioning by the operator services personnel. In response to received information from the caller, the operator services personnel may identify the PSAP responsible for the identified location (act 514). Once identified, the operator services personnel may forward the call by placing a direct 9-1-1 call to the identified PSAP 314 via selective router 312 (act 516). As discussed above, call data associated with the direct 9-1-1 call may be modified to indicate that the 9-1-1 call is an operator assisted call requiring location and telephone number confirmation, or alternatively, to include preliminary caller location and/or emergency information.

CONCLUSION

Implementations consistent with the principles of the invention enable provision of 9-1-1 service functionality to all manner of internet telephony users.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, one or more of the acts described with respect to FIG. 5 may be performed by server 306/406, operator services interface 308/408 or any other suitable device (or combination of devices) in system 300/400.

Moreover, while series of acts have been described with regard to FIG. 5, the order of the acts may be varied in other implementations consistent with the present invention. Moreover, non-dependent acts may be implemented in parallel.

It will also be apparent to one of ordinary skill in the art that aspects of the invention, as described above, may be implemented in many different forms of software, firmware, and hardware. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system for facilitating 9-1-1 service delivery to internet telephony customers, comprising:
   a server device for receiving a 9-1-1 call from a user device via a data network, the 9-1-1 call being based on "9-1-1" digits dialed at the user device,
   where the server device is configured to:
      identify whether the user device is a fixed location user device or a mobile user device, and
      forward the 9-1-1 call to an operator services interface operatively connected to the server device based on whether the user device is identified as the fixed location user device or the user device is identified as the mobile user device.

2. The system of claim 1, further comprising:
   a storage medium associated with the server device for storing profile information associated with the user device.

3. The system of claim 2, where the profile information includes an indication as to whether the user device is the fixed location user device or the mobile user device.

4. The system of claim 1, where the server device is configured to translate the received "9-1-1" digits to a "0" digit when the user device is identified as the mobile user device.

5. The system of claim 1, further comprising:
   a gateway device for interfacing between the data network and the operator services interface.

6. The system of claim 1, where the operator services interface is configured to:
   enable operator services personnel associated with the operator services interface to identify one of an appropriate emergency service provider (ESP) or public safety answering point (PSAP) based on query responses received from a user of the user device; and
   transfer the 9-1-1 call to the identified ESP or PSAP for handling.

7. The system of claim 6, where the ESP is operatively connected to the operator services interface for receiving the transferred 9-1-1 call from the user device.

8. The system of claim 6, further comprising:
   a selective router operatively connected to both the operator services interface and the PSAP for routing the transferred 9-1-1 call from the operator services interface to the identified PSAP.

9. The system of claim 8, where the transferred 9-1-1 call is routed to the PSAP via a designated 911 trunk line identified by the operator services interface.

10. The system of claim 9, where an Automatic Number Identification (ANI) associated with the transferred 9-1-1 call indicates that the transferred 9-1-1 call is an operator assisted call.

11. The system of claim 1, where the data network is an Internet Protocol (IP) based network and where the user device is a voice over IP (VoIP) user device.

12. The system of claim 1, where the server device is configured to:
determine whether an Automatic Number Identification (ANI) associated with the 9-1-1 call is resolvable from a calling party number (CPN) when the user device is identified as the fixed location user device, and
forward the 9-1-1 call to the operator services interface when it is determined that the ANI is not resolvable.

13. The system of claim 1, where the user device is a session initiation protocol (SIP) phone and the server device includes both a SIP proxy server and a SIP redirect server.

14. A method for providing 9-1-1 services to an internet telephony user, comprising:
receiving, by a server device, a 9-1-1 call based on dialed digits "9-1-1" from a user device via a data network;
identifying, by the server device, whether the user device is a mobile user device;
translating, by the server device, the dialed digits "9-1-1," when it is determined that the user device is the mobile user device; and
forwarding, by the server device, the received 9-1-1 call to an operator services interface.

15. The method of claim 14, comprising:
determining whether the user device is a fixed location user device, and where the translating comprises:
translating the received "9-1-1" digits associated with the 9-1-1 call to a "0" digit, when it is determined that the user device is the mobile user device.

16. The method of claim 15, comprising:
determining whether an automatic number identification (ANI) associated with the user device can be resolved when it is determined that the user device is the fixed location user device; and
translating the received "9-1-1" digits associated with the 9-1-1 call to a "0" digit when it is determined that the ANI associated with the user device cannot be resolved.

17. The method of claim 14, comprising:
determining the geographic location of a user based on interactive querying between the user and operator services personnel in response to the forwarded 9-1-1 call received by the operator services interface;
identifying an appropriate public safety answering point (PSAP) associated with the determined geographic location; and
forwarding the 9-1-1 call to the identified PSAP.

18. The method of claim 17, where forwarding the 9-1-1 call to the identified PSAP further comprises:
forwarding the 9-1-1 call on a dedicated 911 trunk line associated with the identified PSAP.

19. The method of claim 18, further comprising:
forwarding the 9-1-1 call on the dedicated 911 trunk line associated with the identified PSAP via a selective router associated with the PSAP.

20. The method of claim 18, where forwarding the 9-1-1 call to the identified PSAP further comprises:
including call data with the forwarded 9-1-1 call indicating that the 9-1-1 call is an operator assisted call.

21. A computer-readable medium that includes instructions executable by at least one processor, the computer-readable medium storing instructions for:
receiving a dialed 9-1-1 call based on dialed digits "9-1-1" from a user device;
identifying that the user device is a mobile device not having a fixed geographic location;
manipulating the dialed digits "9-1-1" to route the 9-1-1 call to an operator services interface; and
forwarding the 9-1-1 call to the operator services interface.

22. A method comprising
receiving, at a server device, a dialed 9-1-1 call based on dialed digits "9-1-1" from a user device;
identifying, by the server device, that the user device is a mobile device not having a fixed geographic location;
manipulating, by the server device and based on the identifying, the dialed digits "9-1-1" to route the 9-1-1 call to an operator services interface; and
forwarding, by the server device, the 9-1-1 call to the operator services interface.

* * * * *

UNITED STATES PATENT AND TRADEMARK OFFICE
CERTIFICATE OF CORRECTION

PATENT NO.        : 8,073,111 B2
APPLICATION NO.   : 12/346223
DATED             : December 6, 2011
INVENTOR(S)       : Colunga It is certified that error appears in the above-identified patent and that said Letters Patent is hereby corrected as shown below:

In Column 1, Line 20, delete "quickly," and insert -- quickly. --, therefor.

In Column 2, Line 6, delete "is in" and insert -- is --, therefor.

In Column 2, Line 20, delete "ALI/DMBS" and insert -- ALI/DBMS --, therefor.

In Column 6, Line 30, delete ""0,"" and insert -- "0" --, therefor.

Signed and Sealed this
Twelfth Day of June, 2012

David J. Kappos
*Director of the United States Patent and Trademark Office*